(12) United States Patent
McDonald

(10) Patent No.: US 6,643,426 B1
(45) Date of Patent: Nov. 4, 2003

(54) MECHANICALLY ASSISTED RELEASE FOR MEMS OPTICAL SWITCH

(75) Inventor: Terrance G. McDonald, Painted Post, NY (US)

(73) Assignee: Corning Incorporated, Corning, NY (US)

(*) Notice: Subject to any disclaimer, the term of this patent is extended or adjusted under 35 U.S.C. 154(b) by 292 days.

(21) Appl. No.: 09/675,331

(22) Filed: Sep. 28, 2000

Related U.S. Application Data

(63) Continuation-in-part of application No. 09/421,765, filed on Oct. 19, 1999.

(51) Int. Cl.[7] .................................................. G02B 6/35
(52) U.S. Cl. ........................................... 385/18; 385/16
(58) Field of Search ...................................... 385/16–23

(56) References Cited

U.S. PATENT DOCUMENTS

| | | | |
|---|---|---|---|
| 4,580,873 A | 4/1986 | Levinson | 525/91 |
| 4,725,127 A | 2/1988 | Malinge et al. | 359/223 |
| 4,932,745 A | 6/1990 | Blonder | 385/18 |
| 5,039,193 A | 8/1991 | Snow et al. | 385/25 |
| 5,119,448 A | 6/1992 | Schaefer et al. | 385/4 |
| 5,148,506 A | 9/1992 | McDonald | 385/16 |
| 5,208,880 A | 5/1993 | Riza et al. | 385/18 |
| 5,226,099 A | 7/1993 | Mignardi et al. | 385/19 |
| 5,255,332 A | 10/1993 | Welch et al. | 385/17 |
| 5,364,742 A | 11/1994 | Fan et al. | 430/317 |
| 5,367,584 A | 11/1994 | Ghezzo et al. | 385/17 |
| 5,619,177 A | 4/1997 | Johnson et al. | 337/140 |
| 5,699,462 A | 12/1997 | Fouquet et al. | 385/18 |
| 5,760,947 A | 6/1998 | Kim et al. | 359/29.1 |
| 5,781,331 A | 7/1998 | Carr et al. | 359/288 |
| 5,886,811 A | 3/1999 | Min | 359/291 |
| 5,960,132 A | 9/1999 | Lin | 385/18 |
| 6,149,190 A | * 11/2000 | Galvin et al. | 280/735 |
| 6,381,381 B1 | * 4/2002 | Takeda et al. | 385/16 |
| 6,473,545 B2 | * 10/2002 | Akkaraju et al. | 385/22 |
| 2002/0046985 A1 | * 4/2002 | Daneman et al. | 216/2 |

FOREIGN PATENT DOCUMENTS

| | | |
|---|---|---|
| EP | 0 880 040 A2 | 5/1998 |
| EP | 0 902 538 A2 | 9/1998 |
| JP | 55-111905 | 8/1980 |
| JP | 57-94702 | 6/1982 |
| JP | 57-192902 | 11/1982 |
| JP | 62-138820 | 6/1987 |
| JP | 1-200317 | 8/1989 |
| JP | 63-84915 | 4/1998 |

OTHER PUBLICATIONS

Lee, Shi–Sheng et al.; *Surface–Micromachined Free–Space Fiber Optical Switches With Integrated Microactuators for Optical Fiber Communication Sytems;* Transducers '97, Jun. 16–19, 1997.

Juan, W.H. et al.; *High–Aspect–Ratio Si Vertical Micromirror Arrays for Optical Switching;* Journal of Micromechanical Systems, vol. 7, No. 2, Jun. 1998.

Bart, Stephen F., et al.; *Overcoming stiction in MEMS manufacturing;* MICRO, Mar. 1995; pp. 49, 50, 52, 54, 56, 58.

Petersen, Kurt E.; *Dynamic Micromechanics on Silicon: Techniques and Devices;* IEEE Transactions on Electron Devices, vol. ED–25, No. 10, Oct. 1978; pp. 1241–1250.

(List continued on next page.)

*Primary Examiner*—Hemang Sanghavi
*Assistant Examiner*—Sarah U Song
(74) *Attorney, Agent, or Firm*—Joanne N. Pappas

(57) ABSTRACT

An optical switch is disclosed that includes a pixel member that moves between a quiescent switch state and an active switch state. An assisted-release mechanism is coupled to the pixel member. It applies a force to the pixel member in the active switch state to enhance the response time of the switch when being reset to the quiescent switch state.

23 Claims, 3 Drawing Sheets

OTHER PUBLICATIONS

Marxer, Cornel, et al; *Vertical Mirrors Fabricated by Deep Reactive Ion Etching for Fiber–Optic Switching Applications;* Journal of Microelectromechanical Systems, vol. 6, No. 3, Sep. 1997; pp. 277–285.

Dautartas, Mino F., et al.; *A Silicon–Based Moving–Mirror Optical Switch;* Journal of Lightwave Technology, vol. 10, No. 8, Aug. 1992; pp. 1078–1085.

McCormick, F.B., et al.; *Optical circuitry for free–space interconnections;* Applied Optics, vol. 29, No. 14, May 10, 1990; pp. 2013–2018.

Pister, K.S.J., et al.; *Microfabricated hinges;* Sensors and Actuators, A. 33, 1992; pp. 249–256.

Toshiyoshi, Hiroshi, et al.; *Electrostatic Micro Torsion Mirrors for an Optical Switch Matirx;* Journal of Microelectromechanical Systems, vol. 5, No. 4, Dec. 1996; pp. 231–237.

Wu, Ming C., et al.; *Optical MEMS: Huge Possibilities for Lilliputian–Sized Devices;* Optics and Photonics News, Jun. 1998; pp. 25–29.

Lee, Shi–Sheng, et al.; *Free–Space Fiber–Optic Switches Based on MEMS Vertical Torsion Mirrors;* Journal of Lightwave Technology, vol. 17, No. 1, Jan. 1999; pp. 7–13.

\* cited by examiner

MECHANICALLY ASSISTED RELEASE FOR MEMS OPTICAL SWITCH

CROSS-REFERENCE TO RELATED APPLICATIONS

This is a continuation-in-part of U.S. patent application Ser. No. 09/421,765 filed on Oct. 19, 1999, the content of which is relied upon and incorporated herein by reference in its entirety, and the benefit of priority under 35 U.S.C. §120 is hereby claimed.

BACKGROUND OF THE INVENTION

1. Field of the Invention

The present invention relates generally to optical switches, and particularly to optical switches employing movable MEMS mirrors.

2. Technical Background

Currently, the demand for bandwidth is increasing exponentially. Network designers are seeking ways to move network functionality from the electrical domain into the optical domain to thereby exploit the available bandwidth in single mode optical fibers. Many networks that are operational today employ relatively low-speed optical-electric conversion units at network nodes. These units convert light signals into electrical signals before switching, and reconvert them into light signals afterwards. The bandwidth of electronic switching equipment is limited to about 10 GHz. This represents an unacceptable bottleneck. A need exists for cross-connects and switches that operate in the optical domain to thereby avoid the conversion bottleneck immediately described above.

In one approach that has been considered, an optical switching fabric was fabricated using a planar waveguide array. Trenches were formed at the intersections of the input waveguides and the output waveguides to form switching cross-points. Micromirrors were positioned in the trenches to function as switching pixels. Electrodes were disposed within each cross-point, functioning as actuators. When an electrode was addressed, the micromirror moved within the trench.

This approach has a disadvantage in that the micromirror had an unreasonably slow switching response time. Two primary reasons for this slow response time were discovered. First, Van der Waals forces were produced by index-matching fluids in the trench. Second, the interaction of mechanical surfaces at both the microscopic and macroscopic level caused the micromirror and support plate to adhere to the substrate for a short period of time after switch actuation.

Thus, a need exists for an optical switch having the advantages of the MEMS optical switch, with improved response time. In particular, a need exists for a MEMS switch having an assisted-release mechanism for improving response time.

SUMMARY OF THE INVENTION

A MEMS switch having an assisted-release mechanism that improves response time is disclosed. The assisted-release mechanism is coupled to a pixel member having a plate disposed over a trench in a switch cross-point, and a mirror extending from the plate into the trench. The assisted-release mechanism applies a force to the pixel member to overcome Van der Waal and stiction forces to thereby improve the switch response time.

One aspect of the present invention is an optical device for directing a light signal. The optical device includes a pixel member adapted to move between a first quiescent switch state and a second active switch state. An assisted-release mechanism is coupled to the pixel member, the assisted-release mechanism applying a force to the pixel member in the second active state.

In another aspect, the present invention includes an optical switch for directing at least one light signal. The optical switch includes an optical substrate having at least one trench formed at the intersection of at least one first waveguide and at least one second waveguide. An electrical substrate is coupled to the optical substrate, the electrical substrate having at least one actuator disposed opposite to the at least one trench. The optical switch also includes at least one pixel coupled to the optical substrate and interposed between the trench and the actuator, the at least one pixel moving between a first quiescent switch state and a second active switch state. An assisted-release mechanism is coupled to the pixel member, the assisted-release mechanism applying a force to the pixel member in the second active state.

In another aspect, the present invention includes a method for switching a light signal in an optical switch. The optical switch includes a pixel movable between a light redirecting state and a non-redirecting state, and an actuator that applies a force to the pixel to thereby move the pixel from the redirecting state to the non-redirecting state. The method includes the steps of providing an assisted-release mechanism. The assisted release mechanism is pressed into the pixel member in the non-redirecting state to thereby store potential energy. The potential energy is released when the actuator ceases to apply the force to the pixel, whereby the assisted-release mechanism urges the pixel to move from the non-redirecting state to the redirecting state.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Figure 1:
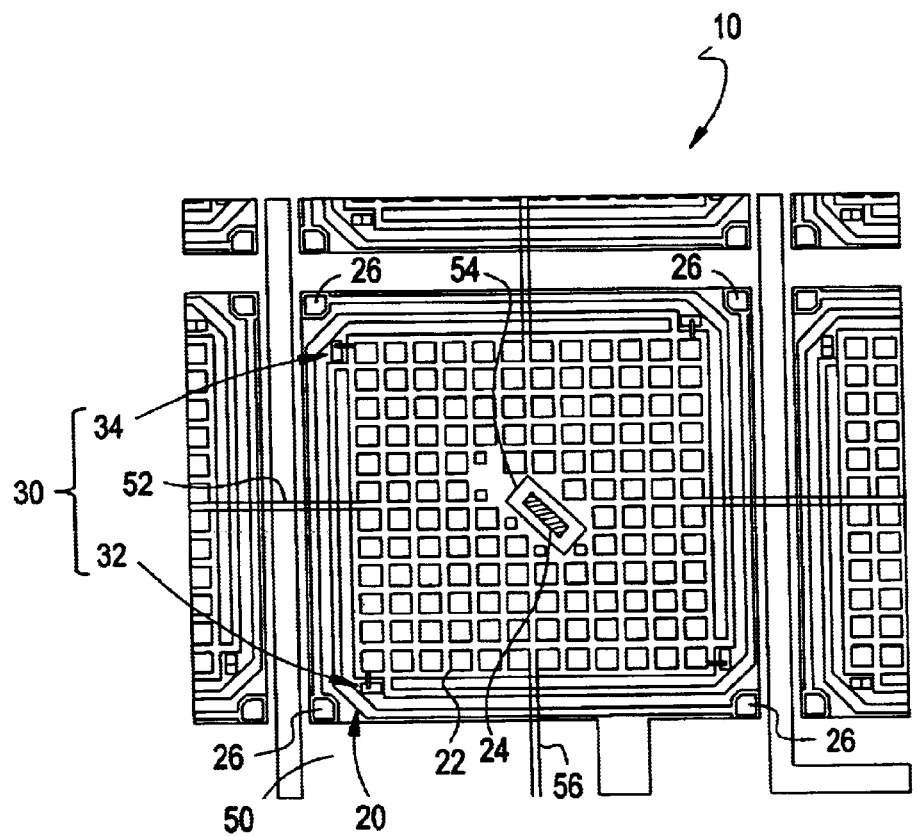
FIG. 1 is a plan view of the optical switch.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the optical switch of the present invention is shown in FIG. 1, and is designated generally throughout by reference numeral 10.

In accordance with the invention, the present invention for optical switch 10 includes pixel member 20 adapted to move between a first quiescent switch state and a second active switch state. Assisted-release mechanism 30 is coupled to pixel member 20. Assisted-release mechanism 30 applies a force to pixel member 20 in the second active switch state.

As embodied herein, and depicted in FIG. 1, optical switch 10 includes pixel 20 which is disposed on optical substrate 50 over a switching cross-point defined by the intersection of waveguide 52 and waveguide 56. Trench 54 is formed at the intersection. Pixel 20 includes plate member 22 and reflector 24. Reflector 24 is disposed in trench 54 when the switch is in the quiescent state. Plate member 22 is anchored to substrate 50 by four hinges 26 positioned at the four corners of plate member 22. Optical switch 10 also includes assisted-release mechanism 30. Assisted-release mechanism 30 includes flexure spring 32 and landing post 34.

Figure 2:
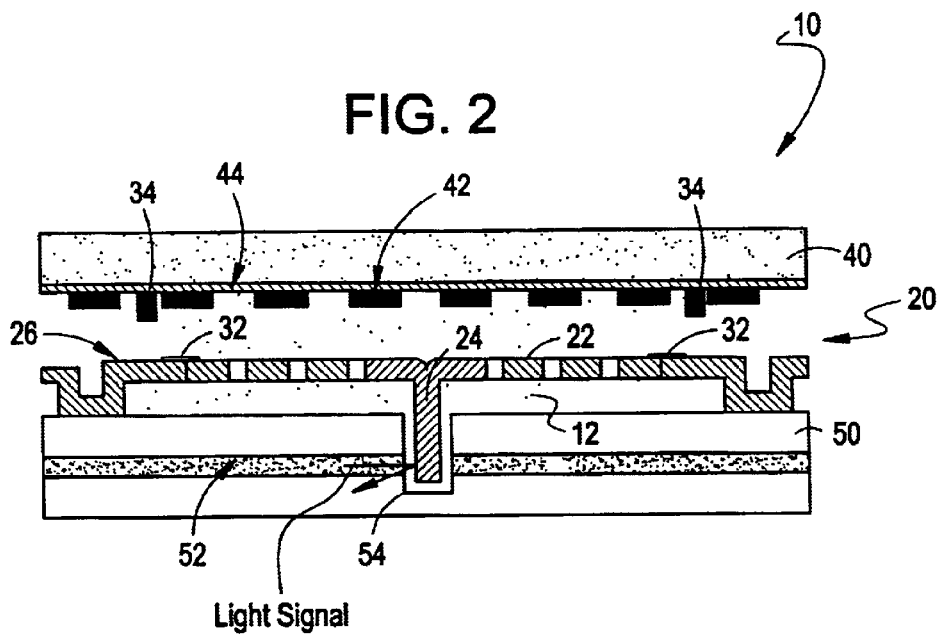
FIG. 2 is a cross-sectional view of the optical switch in accordance with a first embodiment of the invention showing the optical switch in a reflective switch state.

As embodied herein and depicted in FIG. 2, a cross-sectional view of optical switch 10 in accordance with a first embodiment of the invention is disclosed. FIG. 2 shows optical switch 10 in a reflective quiescent switch state. Substrate 50 includes trench 54 formed in waveguide 52 at the switch cross-point. Waveguide 56 is not shown in this view. Waveguide 56 is also bisected by trench 54 at this same location. Reflector 24 is suspended from plate member 22 and extends into trench 54 in the quiescent switch state. Thus, a light signal propagating in waveguide 52 will be intercepted and reflected by reflector 24 into waveguide 56 (not shown). In the first embodiment of the present invention, flexure spring 32 of assisted-release mechanism 30 is disposed over plate member 22 and hinge 26. Landing post 34 is disposed on electrioal substrate 40. Electrode 44 is disposed on the underside of substrate 40. Stopper members 42 are also disposed on the underside of electrical substrate 40. Index-matching fluid 12 may be disposed in the region between substrates 50 and 40 to prevent the light signal from de-collimating when it propagates through trench 54.

Figure 3:
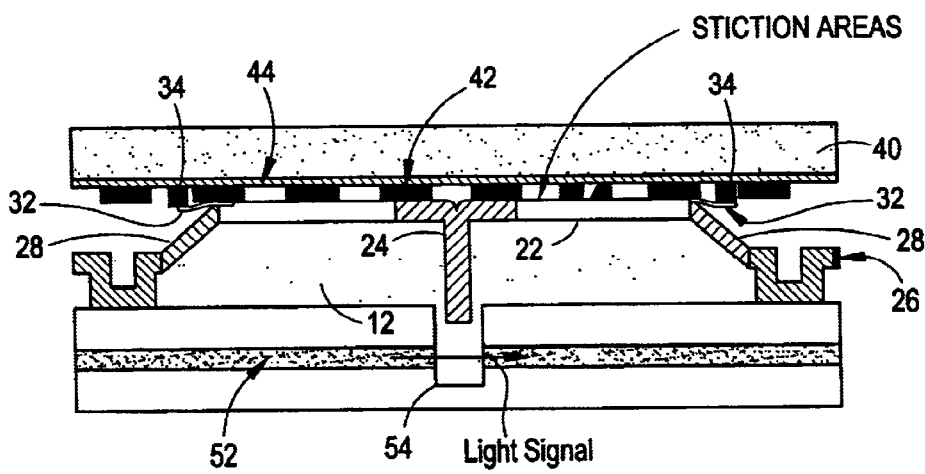
FIG. 3 is a cross-sectional view of the optical switch in accordance with a first embodiment of the invention showing the optical switch in a transmissive switch state.

As embodied herein and depicted in FIG. 3, the cross-sectional view of the optical switch in accordance with a first embodiment of the invention is shown in an active transmissive switch state. When electrode 44 is energized, an electrostatic force attracts plate member 22 to electrode 44 and suspension beams 28 are extended toward electrical substrate 40. Plate member 22 is prevented from touching electrode by stopper members 42. Reflector 24 is lifted out of trench 54 by the movement of plate member 22. Thus, a light signal propagating in waveguide 52 is not reflected by reflector 24, but rather continues to propagate in waveguide 52 after passing through trench 54. At the substantially the same time plate member 22 engages stopper members 42, flexure springs 32 engage landing posts 34. Flexure springs 32 store potential energy in this flexed state.

Optical substrate 50 can be formed using any of the methods and materials commonly known to those of ordinary skill in the art. Such methods may include glass-forming methods, use of semiconductor materials such as silicon, chemical vapor deposition of silica, fused silica, ceramic materials, metallic materials, or polymeric materials. In forming waveguides 52 and 56, an optical waveguide layer is deposited on substrate 50. A variety of methods and materials can be used to form the waveguide layer, including: sol-gel deposition of silica; amorphous silicon; compound semiconductor materials such as III–V or II–VI materials; doped chemical vapor deposition of silica; organic-inorganic hybrid materials; or polymer materials.

Waveguides 52 and 56 are formed using photolithographic techniques by selectively exposing the waveguide layer to radiation. Excess material is removed to form waveguides 52 and 56, and cladding material is subsequently deposited thereon. In another method, waveguide structure material is deposited in a groove etched in the cladding material to form the waveguides 52 and 56. Other techniques such as embossing and micro replication can also be used. Photolithographic techniques are used to form trenches 54. Excess material is removed by etching. Pixel member 30 is fabricated by using micro-machining techniques. In one embodiment, the plate member and reflector 24 are formed using polysilicon. Subsequently, plate member 22 is coated with a metallic material, such as nickel, and the reflector is coated with a highly reflective material, such as gold. In another embodiment, a conformal resist is disposed on the walls of trench 54. The conformal resist adheres to the walls of trench 54 while maintaining the shape of trench 54. A highly reflective metal, such as gold, is deposited in trench 54 to form mirror 24. After further photolithographic processing, a metallic layer is deposited to form plate 22. Finally, the conformal resist is removed to form the structure depicted in FIGS. 1–5.

The material used to make flexure springs 32 may be of any suitable type having a large spring constant and compatable with the processing environment (temperature, etching, deposition, etc.) of the other structures in the switch. In one embodiment, flexure springs are fabricated by a metal deposition technique well known in the art. The material used to fabricate landing posts 34 may also be of any suitable type having low stiction qualities. In one embodiment a photoresist material is used. However, other deposited or etched materials can be used. If the landing posts 34 are made of a conductive material, they will have to be maintained at the same electrical potential as the pixel 20 and flexure spring 32 to avoid electrical short circuits when making contact with the flexure spring 32.

In another embodiment, landing posts 34 for each pixel are used as alignment devices. By using landing posts of differing heights, the angle of the reflector 24 can be adjusted. Thus, if after fabrication of the optical substrate 50 and pixel 20, reflector 24 is not perpendicular, landing posts 34 can be used to adjust the angle until it is normal to waveguides 52 and 56.

In the the final step of switch fabrication, the optical substrate 50 is aligned to electrical substrate 40. The substrates are connected to each other by bonding or some other means. Trenches 54 are filled with matching fluid 12 using access holes, which are then sealed.

The operation of assisted-release mechanism 30 is as follows. When electrode 44 is de-energized, the electrostatic force dissipates and plate member 22 returns to the quiescent switch state with reflector 24 disposed in trench 54. As shown in FIG. 3, stiction develops where plate 22 contacts stopper members 42, opposing the return of reflector 24 into trench 54. Furthermore, Van der Waals forces are produced by indexmatching fluid 12 disposed in the region between substrate 40 and substrate 50. The Van der Waals forces also oppose the return of reflector 24 into trench 54. In a salient feature of the present invention, these forces are substantially neutralized when the potential energy stored in flexure springs 32 is released. Flexure springs 32 push plate member 22 away from stoppers 42 enhancing switch response time.

Figure 4:
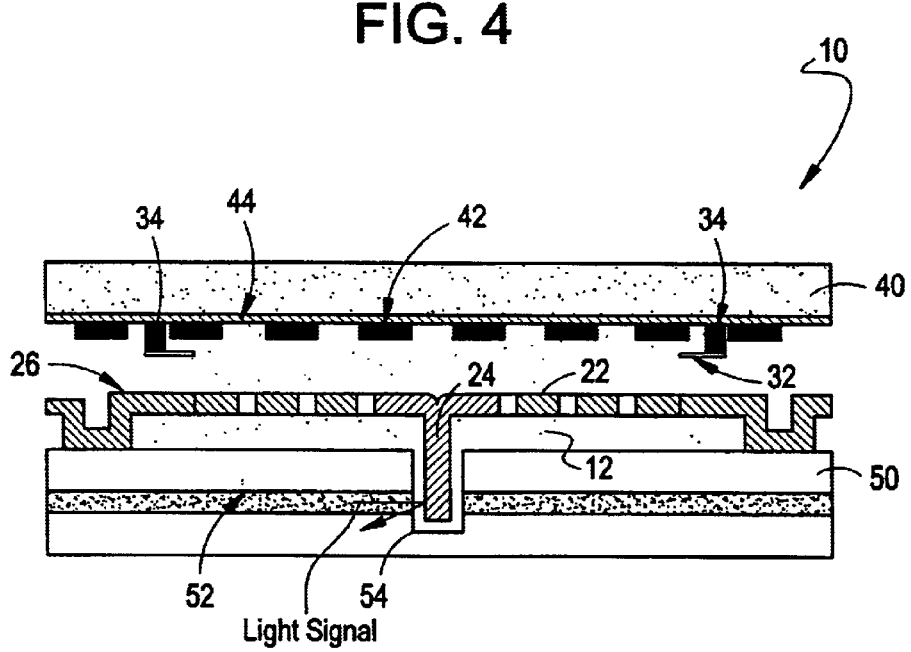
FIG. 4 is a cross-sectional view of the optical switch in accordance with a first embodiment of the invention showing the optical switch in a reflective switch state.
Figure 5:
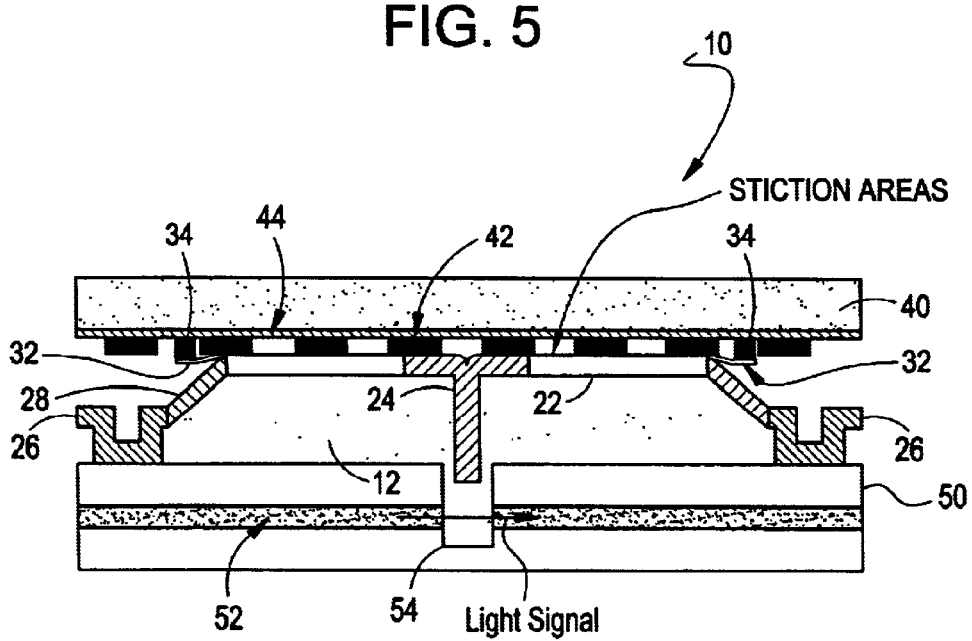
FIG. 5 is a cross-sectional view of the optical switch in accordance with a first embodiment of the invention showing the optical switch in a reflective switch state.

FIGS. 4 and 5 are cross-sectional views of the optical switch in accordance with a second embodiment of the invention. FIG. 4 depicts the second embodiment in the quiescent reflective switch state, whereas FIG. 5 depicts the second embodiment in the active transmissive switch state. The difference between the first embodiment and the second embodiment is the placement of the flexure springs 32. In the second embodiment, flexure springs 32 are disposed on landing posts 34. The disposition of the other components in the second embodiment is identical with the first embodiment. The fabrication details are also identical with the first embodiment. Finally, the operation of both embodiments is identical.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An optical switch for directing at least one light signal, the optical switch including an optical substrate having at least one trench formed at the intersection of at least one first waveguide and at least one second waveguide, and an electrical substrate coupled to the optical substrate, the electrical substrate having at least one actuator disposed opposite to the at least one trench, the optical switch comprising:

at least one pixel coupled to the optical substrate and interposed between the trench and the actuator, the at least one pixel moving between a first quiescent switch state and a second active switch state and wherein the at least one pixel further comprises:
a plate coupled to the optical substrate, the plate being interposed between the trench and the actuator; and
a reflector connected to the plate; and
an assisted-release mechanism coupled to the pixel member, the assisted-release mechanism applying a force to the pixel member in the second active state wherein the assisted-release mechanism further comprises: at least one landing post disposed on the electrical substrate, the landing post engaging the pixel in the second switch state; and at least one flexure spring coupled to the pixel, the flexure spring being deflected by the landing post in the second state to thereby store mechanical energy.

2. The optical switch of claim 1, wherein the reflector is disposed in the trench in the first state to thereby reflect the at least one light signal propagating in the at least one first waveguide into the at least one second waveguide.

3. The optical switch of claim 2, wherein the reflector is disposed in the trench in the first state when the actuator is quiescent.

4. The optical switch of claim 1, wherein the reflector is retracted from the trench in the second state to thereby allow the at least one light signal to propagat e in the at least one first waveguide after passing through the trench without being reflected by the reflector.

5. The optical switch of claim 1, wherein the reflector is retracted from the trench when the actuator causes the plate to move toward the electrical substrate in the second switch state.

6. The optical switch of claim 5, wherein the actuator causes the plate to move by electrostatic attraction.

7. The optical switch of claim 5, wherein the force applied by the assisted-release mechanism moves the pixel away from the electrical substrate when the actuator switches from the second state to the first state by returning to a quiescent condition.

8. The optical switch of claim 1, wherein the flexure spring is connected to the plate.

9. The optical switch of claim 1, wherein the flexure spring is connected to the landing post.

10. The optical switch of claim 1, wherein the stored mechanical energy is released to apply a force to move the pixel away from the electrical substrate when the actuator switches from the second state to the first state by returning to a quiescent condition.

11. The optical switch of claim 1, wherein the at least one landing post includes a plurality of adjustable landing posts, the height of the adjustable landing posts being adjustable to thereby align the pixel member.

12. The optical switch of claim 1, wherein the at least one actuator further comprises:
an electrode dispose on the electrical substrate, the electrode applying an electrostatic attractive force to the pixel when energized in the second switch state; and
aplurality of stopper elements disposed on the electrical substrate, the stopper elements adapted to prevent the pixel from contacting the electrode.

13. The optical switch of claim 12, wherein the electrode is substantially de-energized in the first switch state.

14. The optical switch of claim 12, wherein the at least one actuator further comprises a landing post, the landing post engaging the assisted-release mechanism in the second switch state to thereby store mechanical energy.

15. The optical switch of claim 14, wherein the stored mechanical energy is released, applying a force to thereby move the pixel away from the actuator when the electrode stops applying the electrostatic attractive force to the pixel.

16. The optical switch of claim 1, wherein an index-matching fluid is disposed in the trench to prevent the at least one light signal from de-collimating when it propagates through the trench.

17. The optical switch of claim 1, wherein the at least one trench includes an array of trenches formed in the optical substrate, each of the trenches being formed at the intersection of a first waveguide and a second waveguide, the electrical substrate also includes an array of actuators, each actuator being disposed opposite a corresponding trench, and the at least one pixel includes an array of pixels, each pixel being interposed between a corresponding trench and actuator.

18. A method for switching a light signal in an optical switch, the optical switch including a pixel movable between a light redirecting state and a non-redirecting state, and an actuator that applies a force to the pixel to thereby move the pixel from the redirecting state to the non-redirecting state, the method comprising the steps of:
providing an assisted-release mechanism;
pressing the assisted-release mechanism to the pixel member in the non-redirecting state to thereby store potential energy; and
releasing the potential energy when the actuator ceases to apply the force to the pixel, whereby the assisted-release mechanism urges the pixel to move from the non-redirecting state to the redirecting state; and wherein the step of providing further comprises the steps of providing a landing post juxtaposed to an electrode, the landing post directly contacting the pixel in the non-redirecting state, and providing a flexure spring coupled to the pixel.

19. The method of claim 18, wherein the step of pressing includes pressing the flexure spring against the landing post in the non-redirecting state to thereby store the potential energy.

20. The method of claim 18, wherein the step of providing the flexure spring includes metal deposition.

21. The method of claim 20, wherein the metal is aluminum.

22. The method of claim 18, wherein the step of providing the landing post includes providing a material having low mechanical stiction.

23. The method of claim 22, wherein the material is a photoresist material.

* * * * *